United States Patent [19]

Belanger et al.

[11] Patent Number: 4,972,862
[45] Date of Patent: Nov. 27, 1990

[54] BUMPER JET WASHER

[75] Inventors: Michael J. Belanger, Walled Lake; Calvin R. Visser, Brighton, both of Mich.

[73] Assignee: Belanger, Inc., Northville, Mich.

[21] Appl. No.: 464,446

[22] Filed: Jan. 12, 1990

[51] Int. Cl.5 .............................................. B60S 3/04
[52] U.S. Cl. .................................... 134/123; 134/181
[58] Field of Search ................ 134/45, 123, 180, 181; 239/229, 588

[56] References Cited

U.S. PATENT DOCUMENTS 3,667,486  6/1972  Cole et al. .............................. 134/45

FOREIGN PATENT DOCUMENTS 437672    11/1926  Fed. Rep. of Germany ...... 134/123
1530288   4/1970   Fed. Rep. of Germany ...... 134/123
1051333   9/1953   France ................................. 134/123
509564    7/1939   United Kingdom ................ 134/123

Primary Examiner—Philip R. Coe
Attorney, Agent, or Firm—Brooks & Kushman

[57] ABSTRACT

A vehicle washing apparatus for use in a drive-through wash in which a vehicle moves across a floor and over an elongated pit. The apparatus includes a first manifold transversely spaced from the pit, pivotable about a vertical axis, and mounted to the floor surface. A drive mechanism is provided for oscillating the manifold, causing a first jet of liquid to sweep across the vehicle. A flexible tube provides a source of pressurized liquid to the oscillating first manifold. The tube lies in a generally horizontal plane spaced above the floor and flexes in response to manifold movement providing a low profile and very durable apparatus.

20 Claims, 2 Drawing Sheets

BUMPER JET WASHER

TECHNICAL FIELD

This invention relates to vehicle washing devices and more particularly to floor mounted liquid jet devices for use in a drive-through vehicle wash.

BACKGROUND ART

Drive-through vehicle washes of conventional design move a vehicle to be washed across a floor surface by utilizing a recessed conveyor that engages one of the vehicle wheels. As the vehicle advances through the wash, it passes by a number of stations in which it is washed, rinsed and dried. A different washing apparatus is provided at each station, each apparatus being specifically adapted to clean specific parts of the vehicle.

The front and rear surfaces of the vehicle, particularly the bumpers, have traditionally been difficult to clean due to the level of dirt accumulation, the shape of the bumper and the location of the bumper relative to the region in which the bumper washing apparatus needs to be mounted. Due to these problems, rear and front bumpers are frequently washed manually by attendants using a high pressure stream of heated soapy water applied using a wand. To minimize the labor and improve the quality of the vehicle wash, prior art devices have imbedded in the wash station floor manifolds that spray high pressure streams of hot water on the vehicle front and rear bumpers. To achieve an effective wash, it is desirable to orient the manifold as close to the vehicle surface to be washed as possible and have the stream strike the vehicle as directly as possible. In a quest for optimum performance, it has been determined that two manifolds mounted to a floor such that they oscillate to direct high pressure jets of liquid from a plurality of outlets in each toward the front and rear surfaces of vehicles moved over them best cleans these surfaces.

The problem with using infloor jet washers of the prior art design is that it is necessary to form large elongated pits in the floor specifically for the wash apparatus. In order to achieve maximum hydraulic pump utilization, it is necessary to have two separate pits that are spaced apart, one for the front vehicle wash and one for the rear vehicle wash. Not only is excavating pits of this nature expensive, particularly in retrofit applications, but it becomes very difficult to relocate the infloor bumper jet washers when it is time to renovate or replace the washer system equipment.

DISCLOSURE OF INVENTION

An object of the present invention is to provide a floor mounted bumper and jet wash system that can be installed in a typical drive-through wash system without excavating concrete.

Another object of the present invention is to provide a low cost, high durability bumper jet wash system that can effectively clean vehicle front and rear surfaces by utilizing a source of pressurized liquid.

Yet another object of the present invention is to provide a low profile vehicle washing apparatus that may be mounted directly upon the floor, providing ample clearance for a vehicle passing thereover.

Accordingly, a vehicle washing apparatus of the present invention is adapted for installation in a drive-through vehicle wash system of the type including a conveyor for moving a vehicle across a floor surface along a predetermined path causing the vehicle to pass over a narrow, elongated pit formed in the floor between the vehicle wheels. The vehicle wash apparatus includes a first manifold having a liquid inlet and an outlet nozzle in communication therewith for spraying a first jet of liquid at the vehicle. The first manifold is pivotably attached to the floor at a point spaced transversely from the pit to allow limited oscillatory movement of the first manifold about a vertical axis to cause the first jet of liquid projected therefrom to sweep across the vehicle.

A drive mechanism is provided having at least one portion above the floor for oscillating the first manifold. A flexible tube couples the first manifold to a source of pressurized liquid. The flexible tube has a first end coupled to the first manifold inlet and a second end spaced therefrom to cause the flexible tube to lie in a generally horizontal plane above the floor, flexing in response to the oscillation of said first manifold within the plane to provide a low profile flexible coupling for supplying pressurized liquid to the first manifold.

In the embodiment illustrated, a second manifold is provided having a liquid inlet and liquid outlet in communication therewith for spraying a second jet of liquid at the vehicle. The second manifold is spaced transversely from the first manifold. It is likewise connected to the drive mechanism to cause the second jet of liquid, which is projected from the second manifold, to sweep across the vehicle.

BEST MODE FOR CARRYING OUT THE INVENTION

Figure 1:
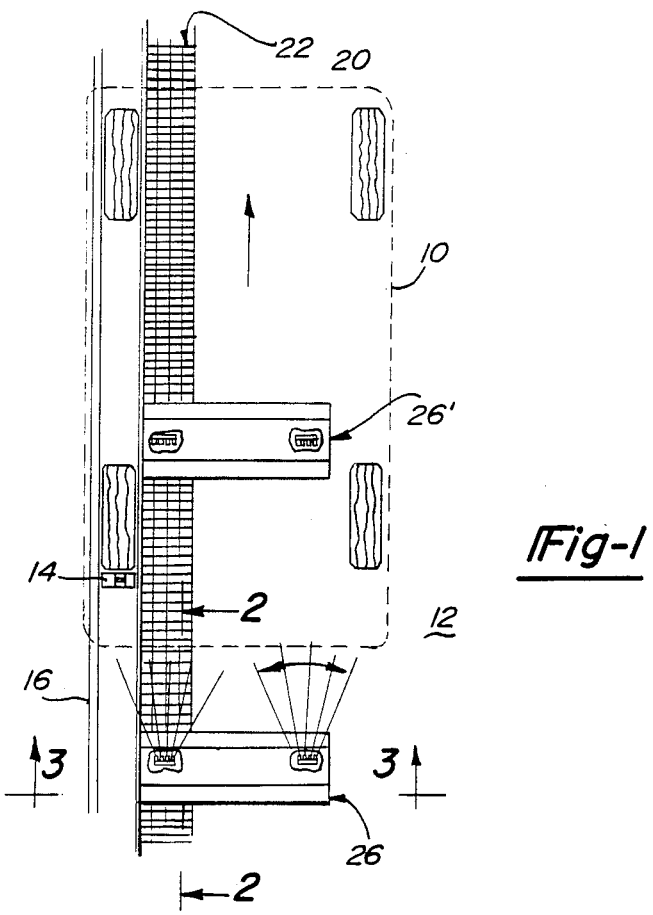
FIG. 1 is a plan view illustrating the orientation of the washing apparatus relative to the vehicle and the conveyor.
Figure 2:
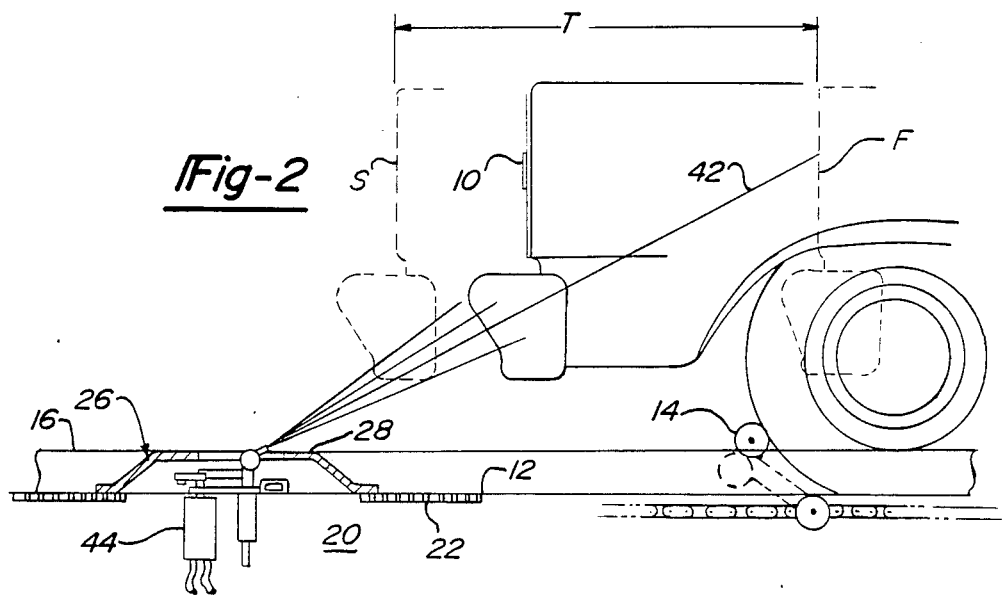
FIG. 2 is an enlarged side cross sectional view taken along line 2—2 of FIG. 1.
Figure 3:
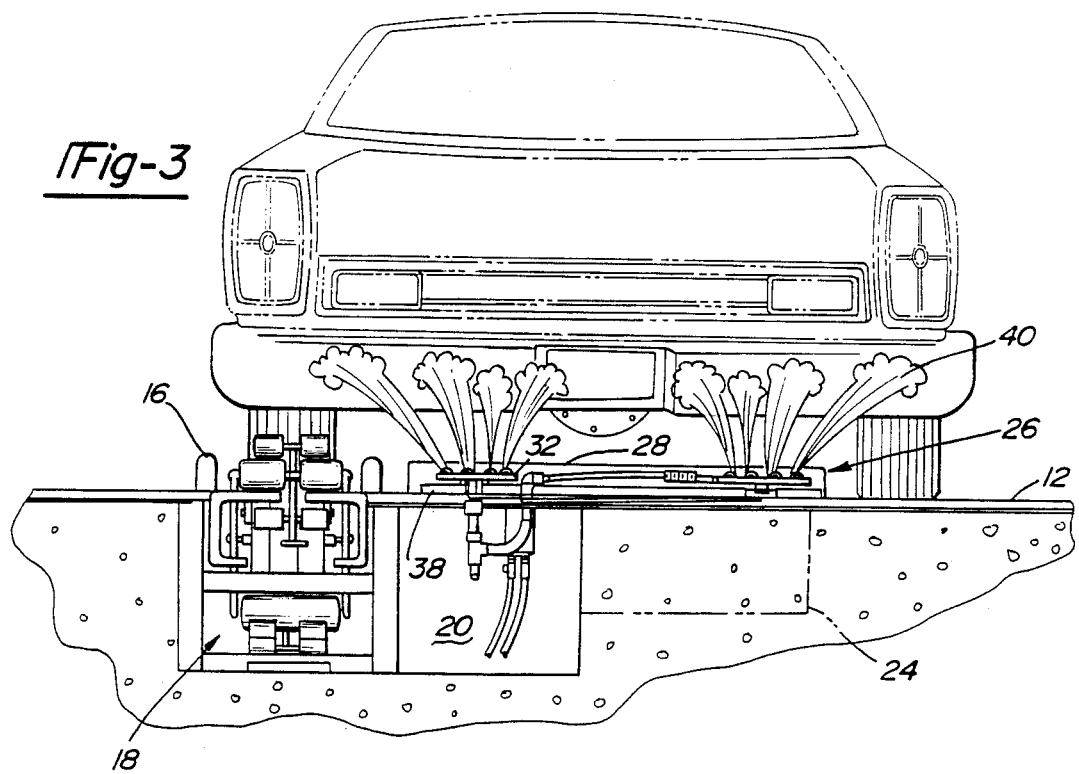
FIG. 3 is an enlarged cross sectional end view taken along line 3—3 of FIG. 1.

The orientation of the bumper jet washing apparatus relative to the vehicle to be cleaned and a wash system and conveyor is illustrated in FIGS. 1-3. An automobile 10 is shown in phantom outline traveling across the floor surface 12. The automobile 10 is moving in the direction of the arrow and is propelled by a drive roller assembly 14. The left wheels of the automobile 10 are retained in a conveyor track 16. The automobile moves through the vehicle wash system rolling across the floor along a predetermined path. The conveyor mechanism for translating the drive roller assembly 14 is located beneath the level of the floor 12, as shown in FIG. 3. Oriented adjacent to the conveyor mechanism 18 is a narrow, elongated pit that extends the length of the vehicle wash system. The elongated pit 20 is oriented between the path of the vehicle wheels and inboard of conveyor track 16. The elongated pit 20 is covered by a removable grate 22. The elongated pit 20 serves as a trough to carry away used water as well as providing a longitudinal passageway through which hoses and conduits supply liquid to the various floor mounted washing apparatuses may be routed.

Prior art floor mounted bumper jet washing devices required that the elongated pit 20 be locally widened by forming a transverse trough 24 shown in dashed outline in FIG. 3. The pressurized water supply and the mechanical mechanism for oscillating the spray manifolds are located below floor level in the trough and in the elongated pit 20. Floor mounted vehicle washing apparatuses of this type are generally referred to as bumper jet washers within the industry even though they are used to wash the entire front and rear portions of the vehicle. The vehicle washing apparatus 26 of the present invention provides a bumper jet washing apparatus which can be mounted on the car wash floor without the necessity for forming a transverse trough to effectively widen the elongated pit 20. The vehicle washing apparatus 26, as shown in FIG. 1, is oriented to wash the rear of the automobile 10. A similar washing apparatus 26' is oriented approximately seven to eight feet in front of the washing apparatus 26 and is used to wash the front of the vehicle. The seven-foot spacing between the two washing apparatuses allows a single pump to be used to supply both the front and rear washing apparatuses with optimum off time between spray cycles when the vehicles are closely spaced during times of maximum usage.

As shown in FIGS. 2 and 3, the washing apparatus 26 is mounted directly upon the floor surface 12 and has a portion that extends into the elongated pit 20. A protective cover 28 extends over the mechanical and hydraulic components of the washing apparatus to provide a neat and clean, aesthetic appearance. In the washing apparatus of the present design shown in this preferred embodiment, two manifolds are provided that spray a high pressure stream of water at the vehicle. A first manifold 30 is transversely spaced from the elongated pit 20, and a second manifold 32 is oriented generally above the elongated pit 20. The first manifold 30 is provided with a liquid inlet 34 and a plurality of outlet nozzles 36 that are of conventional design and that can be adjusted so that various spray angles and orifices may be selected to suit a particular application.

Figure 4:
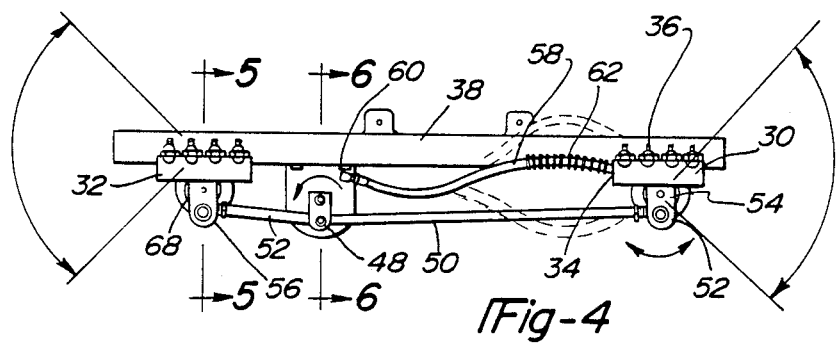
FIG. 4 is a plan view of the washing apparatus with the protective cover removed.

It should be appreciated that the present invention may be utilized with high pressure. For example, when using fresh water, fluid pressures in the 800 to 1,000 PSI range would be applied. Lower fluid pressures, in the 60 to 80 PSI range, would be applied when using reclaimed water. As is generally known in the industry, nozzle sizes are selected to achieve the appropriate flow rate, given the pressure of the water source. When using two manifolds, each having four nozzles, as illustrated in FIG. 4, a flow rate of 18 to 20 gallons per minute works quite well when using fresh water pressurized to 1,000 PSI. To achieve a total flow rate of 18 gallons per minute at 1,000 PSI, orifices having a ½-gallon-per-minute rating at 40 PSI are utilized. For best cleaning action, it has been determined that 0-degree nozzles, i.e., the type that directs a thin, fine stream of liquid, are best from a dirt removal standpoint.

The first and second manifolds 30 and 32 are pivotably attached to frame 38, which is affixed to the floor beneath the path of the vehicle. The frame 38 has a portion that extends above the elongated pit 20, as shown in FIG. 3. The first and second manifolds 30 and 32 are pivotably attached to the frame using conventional sealed bearings 68. The bearings 68 provide an attachment means for pivotably attaching the manifolds to the frame, which is mounted on the floor. The first manifold is fixed relative to the floor at a point spaced transversely from the elongated pit. As the first manifold oscillates, a plurality of first jets of liquid are sprayed from the nozzles 36 of the first manifold and strike the rear of the vehicle. As the manifold is oscillated within a limited range, the first jets of liquid 40, as illustrated in FIG. 3, sweep transversely across the vehicle. In the embodiment shown, two manifolds are utilized, the first manifold generally cleaning the right side of the vehicle and the second manifold generally cleaning the left side of the vehicle.

The oscillation of the manifolds about their respective axes causes the jets of liquid dispensed by the nozzles to translate horizontally across the rear of the vehicle. Vertical movement of the jets across the rear of the vehicle is achieved as a result of the relative motion between the vehicle and the stationary washing apparatus 26. The relative vertical motion of the jet liquid relative to the rear of the vehicle is illustrated in FIG. 2. The paths of the jets of liquid from the four nozzles are illustrated by lines 42. Note that the nozzles are oriented at slightly different angles to obtain optimal coverage.

The washing apparatus 26 is run intermittently throughout the vehicle wash cycle. To conserve water and energy, the vehicle washing apparatus 26 is run for a short time after each vehicle passes over the washing apparatus, the travel of the vehicle during the operation of washing apparatus 26 being illustrated by distance T in FIG. 2. The vehicle is shown in FIG. 2 at an intermediate position during the wash cycle. The start of the wash occurs when the vehicle is at position S, illustrated by the dashed outline. The wash is finished when the vehicle is at position F, after traveling a distance T. During this period of travel, the position at which the second jet of liquid 42 strikes the vehicle, moves upwardly from the bottom portion of the bumper to the upper edge of the deck lid.

To clean the bumper thoroughly without omitting any areas, the preferred apparatus oscillates the manifolds at a rate of 80 cycles per minute. The manifolds oscillate within an angle of approximately 90-degrees. Note that the angle of the nozzles can be adjusted horizontally as well as vertically so that the nozzles can be oriented to achieve full coverage at the start of the bumper wash cycle when the vehicle is at position S.

Figure 5:
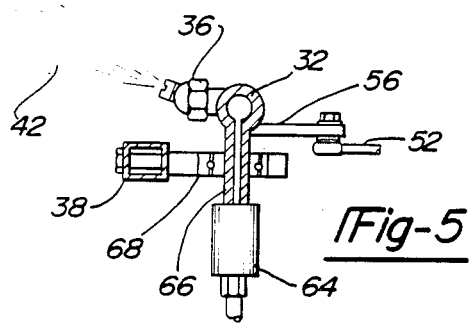
FIG. 5 is a cross sectional side view taken along line 5—5 of FIG. 4.
Figure 6:
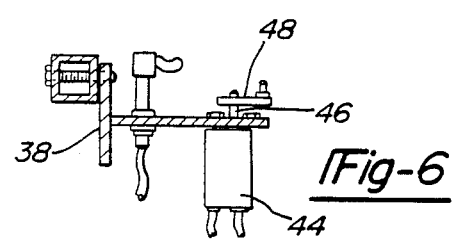
FIG. 6 is a cross sectional view taken along line 6—6 of FIG. 4.

In the preferred embodiment shown, the first and second manifolds are oscillated by an hydraulic motor 44, shown in FIGS. 2, 5 and 6. The hydraulic motor 44 has an output shaft 46 provided with a crank arm 48. A pair of first and second links 50 and 52, respectively, are pivotably connected to the crank arm and extend transversely therefrom to a first manifold lever 54 and a second manifold lever 56 respectively. The ends of the first and second links 50 and 52 are pivotably connected to the crank arm and to the first and second manifold levers using conventional circle rod end bearings. The effective lengths of crank arm 48 and first and second manifold levers 54 and 56 are appropriately selected so that the manifolds oscillate through a 90-degree range as the upwardly disposed motor shaft rotates. The first and second links extend in a generally horizontal plane oriented slightly above the floor surface 12.

The hydraulic motor 44, with the crank arm 48 and the first and second manifold levers 54 and 56, provide drive for oscillating the first and second manifolds. As illustrated, at least one portion of the drive means extends above the surface of the floor, thereby enabling the first manifold to be oscillated without the need for excavating a transverse trough below floor level. Similarly, a source of pressurized liquid must be provided to the first manifold, which is likewise above floor level but sufficiently low and compact to enable the vehicle to pass over the washing apparatus without interference.

As shown in FIG. 4, a flexible tube 58 provides pressurized liquid to the first manifold 30. The flexible tube 58 has a first end, which is coupled to the first manifold inlet, and a second end, which is spaced transversely therefrom. As shown in the preferred embodiment, the second end of the flexible tube is fixed to frame 38 to prevent the second end of the tube from moving within the horizontal plane in which the tube is disposed. In the preferred embodiment, the second end of the flexible tube is affixed to prevent rotation about its attachment point. However, it should be noted that the attachment point could be allowed to rotate to minimize tube flexing.

The flexible tube 58 lies in a substantially horizontal plane spaced above the floor. As the manifold 30 oscillates, the flexible tube 58 flexes within this horizontal plane in a snake-like manner. When the first manifold 30 is in a position approximately midway through its oscillatory range, the flexible tube is generally S-shaped as shown. The contour of this S changes as the manifold oscillates throughout its range as illustrated by the dashed lines showing the two extreme limits of tube travel.

The tube stays within a substantially horizontal plane during manifold oscillation without rubbing on the protective cover 28, the frame 38 or the first link 50. To maintain the flexible tube 58 in a horizontal plane, it is important to select a tube length that bears a specific relationship with the distance between the tube's second end attachment point 60 and the manifold inlet when the manifold is oriented in the straight-ahead position. Preferably, a free length of the tube falls within 1.15 to 1.5 times the distance between the free end attachment point and the manifold inlet in the midway position of oscillatory movement. If the flexible tube is made too long, it will tend to whip and move out of the horizontal plane and rub on the surrounding structure. If the flexible tube is too short, it will be stressed unduly and will prematurely fatigue.

The flexible tube 58 is preferably formed of a plastic material suitable for high pressure operation. A preferred tube material is synthetically reinforced hose of 5/16-inch inside diameter and of the type sold by the Synflex Company as model 3730. To further stabilize the hose and to maintain it in the horizontal plane, a coil spring stiffener 62 is provided. The stiffener coaxially extends about the flexible tube where a portion of its length is adjacent to one of its two ends. The stiffener has a fixed end, which is attached to the first manifold in the preferred embodiment, and has a free end, which is spaced therefrom and which can freely move relative to the flexible tube that extends therethrough. As the flexible tube moves in its oscillatory motion, the stiffener resiliently biases the flexible tube to the normal or straight ahead position in the horizontal plane of the tube. Coil spring stiffeners of this type are readily available and are typically used to minimize tube kinking and tube stress adjacent a fixed end. Preferably, the coil spring stiffener has a length that extends approximately 0.2 to 0.4 times the free length of the hose, as illustrated in FIG. 4.

In the preferred embodiment shown, the first manifold is provided with an inlet aligned along a generally horizontal manifold axis that is coaxial with the first end of the flexible tube proximate its point of attachment. When the manifold is oriented at the midway position in its oscillatory motion, as shown in FIG. 4, the axis of the manifold inlet is generally aligned with tube's second end attachment point 60. The inlet of the first manifold is radially spaced from the first manifold pivot point, thereby causing the inlet to move in an arcuate path lying in the horizontal plane of the tube as the manifold oscillates. This orientation further aids in maintaining the tube constantly within the horizontal plane.

As illustrated in the embodiment of the invention shown, a flexible tube need only be used in conjunction with the first manifold. Since the second manifold is oriented above the elongated pit 20 a conventional hydraulic swivel coupling 64 may be utilized. Of course, a flexible tube similar to that used for the first manifold could be utilized as an alternative to a hydraulic swivel coupling 64. In the second manifold embodiment, shown in FIG. 5, pressurized liquid is fed axially through a second axle shaft 66, which extends through a sealed bearing 68. The first manifold axle shaft (not shown) need not be provided with an internal passageway since liquid is being provided to the manifold radially.

It is also understood, of course, that while the form of the invention herein shown and described constitutes a preferred embodiment of the invention, it is not intended to illustrate all possible forms thereof. It will also be understood that the words of description rather than limitation, and that various changes may be made without departing from the spirit and scope of the invention disclosed.

What is claimed:

1. A vehicle washing apparatus for use in a drive through vehicle wash system of the type including a conveyor for moving a vehicle across a floor surface along a predetermined path causing the vehicle to pass over a narrow elongated pit formed in the floor between the vehicle's wheels, said apparatus comprising:
   a first manifold having a liquid inlet and an outlet nozzle in communication therewith for spraying a first jet of liquid at a vehicle;
   attachment means for pivotably attaching the first manifold to the floor at a point spaced transversely from the elongated pit to allow limited oscillatory movement of the first manifold to cause the first jet of liquid to sweep across the vehicle;
   drive means having at least one portion above the floor for oscillating the first manifold; and
   a flexible tube having a first end coupled to the first manifold inlet and a second end spaced therefrom coupled to a source of pressurized liquid, said flexible tube lying in a generally horizontal plane above the floor and flexing in response to the oscillation of said first manifold within said horizontal plane to provide a low profile flexible coupling for supplying pressurized liquid to the first manifold.

2. The apparatus of claim 1 further comprising a second manifold having a liquid inlet connected to a source of pressurized liquid and an outlet nozzle for spraying a second jet of liquid at the vehicle, wherein said attachment means pivotably supports the second manifold at a point spaced above the elongated pit, and the drive means oscillates both the first and second manifolds causing the first and second jets of liquid to simultaneously sweep across the vehicle.

3. The apparatus of claim 1 wherein said drive means further comprises:
- a rotary motor having a rotary motor output shaft and being at least partially located within the elongated pit;
- a crank arm affixed to the rotary motor output shaft; and
- a link pivotably connected to and extending between the crank arm and the first manifold to cause the manifold to oscillate as the crank arm is rotated by the rotary motor, said link lying in a horizontal plane above the floor which is spaced sufficiently from the plane of the flexible tube to prevent interference, yet close enough thereto to provide a low profile allowing the vehicle to pass thereover.

4. The apparatus of claim 1 further comprising a stiffener coaxially extending about a portion of the flexible tube adjacent an end, having a fixed end which is fixed relative to the end of the tube and a free end which is spaced therefrom, said stiffener elastically biasing the flexible tube to a normal position and flexing therewith to maintain the flexible tube in the horizontal plane as the manifold is oscillated.

5. The apparatus of claim 4 wherein said stiffener further comprises a coil spring having a length within the range of 0.2 to 0.4 times the flexible tube length.

6. The apparatus of claim 4 wherein said stiffener cooperates with the flexible tube first end.

7. The apparatus of claim 1 wherein said flexible tube second end is fixed relative to the floor at an attachment point to prevent the flexible tube second end from translating within the horizontal plane of the tube.

8. The apparatus of claim 7 wherein said flexible tube second end is fixed relative to the floor to prevent rotation of the flexible tube about the attachment point.

9. The apparatus of claim 8 wherein said first manifold has a generally horizontal inlet axis aligned with said liquid inlet and locally coaxially aligned with the flexible tube first end, said inlet axis being aligned with the flexible tube second end when the first manifold is positioned generally midway in the oscillatory movement.

10. The apparatus of claim 1 wherein the length of the flexible tube is within the range of 1.15 to 1.50 times the distance between the first manifold inlet and the flexible tube second end attachment point when the manifold is oriented at the midway position in the oscillatory movement.

11. The apparatus of claim 10 wherein said flexible tube is generally S-shaped when the manifold is oriented midway in the oscillatory movement.

12. The apparatus of claim 1 wherein said flexible tube comprises a high pressure flexible plastic hose.

13. The apparatus of claim 12 wherein said plastic hose is formed of a reinforced synthetic rubber like material.

14. The apparatus of claim 1 wherein said first manifold inlet is radially spaced from the pivotable attachment point thereby causing the inlet to move along an arcuate path lying within the horizontal plane of the flexible tube.

15. The apparatus of claim 14 further comprising a stiffener coaxially extending about a portion of the flexible tube adjacent an end, having a fixed end which is fixed relative to the end of the tube and a free end which is spaced therefrom, said stiffener elastically biasing the flexible tube to a normal position and flexing therewith to maintain the flexible tube in the horizontal plane as the manifold is oscillated.

16. A vehicle washing apparatus for use in a drive through vehicle wash system of the type including a conveyor for moving a vehicle across a floor surface along a predetermined path causing the vehicle to pass over a narrow elongated pit formed in the floor between the vehicle wheels, said apparatus comprising:
- a frame for attachment to the floor extending transversely and lying between the path of the vehicle wheels, said frame extending over a portion of the narrow elongated pit;
- a first manifold having a liquid inlet and an outlet nozzle in communication therewith for spraying a first jet of liquid at the vehicle, said first manifold being pivotably attached to the frame at a point spaced transversely from the elongated pit to allow limited oscillatory movement of the first manifold to cause the first jet of liquid to sweep across the vehicle;
- a second manifold having a liquid inlet and an outlet nozzle in communication therewith for spraying a second jet of liquid at the vehicle, said second manifold being pivotably attached to the frame at a point spaced above the elongated pit to allow limited oscillatory movement of the second manifold to cause a second jet of liquid to sweep across the vehicle;
- drive means affixed to the frame and at least partially extending into the elongated pit and having a portion above the floor for oscillating the first and second manifolds;
- means for coupling the second manifold to a source of pressurized liquid; and
- a flexible tube having a first end coupled to the first manifold and a second end spaced therefrom coupled to a source of pressurized liquid, said flexible tube lying in a generally horizontal plane above the floor and flexing in response to the oscillation of said first manifold within said horizontal plane to provide a low profile flexible coupling for supplying pressurized fluid to the first manifold.

17. The apparatus of claim 16 further comprising a protective cover attached to the floor and extending above the frame, drive means and flexible tube, said cover being provided with a pair of openings located generally above the first and second manifolds to enable the first and second jets of liquid to pass therethrough.

18. The apparatus of claim 16 wherein said drive means further comprises a rotary motor having a housing affixed to the frame and a rotary motor output shaft extending generally vertically therefrom:
- a crank arm affixed to the rotary motor output shaft; and
- a pair of links pivotably connected to the crank arm, said links pivotably coupled to the first and second manifold to cause said manifolds to oscillate as the crank arm is rotated by the rotary motor, said links lying in a horizontal plane above the floor and spaced sufficiently from the plane of the flexible tube to prevent interference, yet close enough thereto to provide a low profile allowing a vehicle to pass thereover.

19. The apparatus of claim 16 further comprising a stiffener coaxially extending about a portion of the flexible tube adjacent an end, having a fixed end which is fixed relative to the end of the tube and a free end which is spaced therefrom, said stiffener elastically biasing the flexible tube to a normal position and flexing therewith maintain the flexible tube in the horizontal plane as the manifold is oscillated.

20. The apparatus of claim 16 wherein the length of the flexible tube is within the range of 1.15 to 1.50 times the distance between the first manifold inlet and the flexible tube second end attachment point when the manifold is oriented at the midway position in the oscillatory movement.

* * * * *